(12) United States Patent
Goodacre et al.

(10) Patent No.: US 11,138,146 B2
(45) Date of Patent: Oct. 5, 2021

(54) HYPERSCALE ARCHITECTURE

(71) Applicant: Bamboo Systems Group Limited, Cambridge (GB)

(72) Inventors: John Goodacre, Cambridge (GB); Giampietro Tecchiolli, Cambridge (GB)

(73) Assignee: BAMBOO SYSTEMS GROUP LIMITED, Cambridge (GB)

( * ) Notice: Subject to any disclaimer, the term of this patent is extended or adjusted under 35 U.S.C. 154(b) by 0 days.

(21) Appl. No.: 16/340,062

(22) PCT Filed: Oct. 5, 2016

(86) PCT No.: PCT/IB2016/055966
§ 371 (c)(1),
(2) Date: Apr. 5, 2019

(87) PCT Pub. No.: WO2018/065804
PCT Pub. Date: Apr. 12, 2018

(65) Prior Publication Data
US 2019/0294583 A1 Sep. 26, 2019

(51) Int. Cl.
*G06F 15/78* (2006.01)
*G06F 9/455* (2018.01)
*G06F 9/50* (2006.01)

(52) U.S. Cl.
CPC ...... *G06F 15/7871* (2013.01); *G06F 9/45558* (2013.01); *G06F 9/5027* (2013.01); *G06F 9/5061* (2013.01); *G06F 9/5077* (2013.01); *G06F 15/7839* (2013.01); *G06F 2009/4557* (2013.01); *G06F 2009/45595* (2013.01); *G06F 2209/5011* (2013.01)

(58) Field of Classification Search
CPC ... G06F 9/46; G06F 9/50; H04L 47/70; H04L 43/06
See application file for complete search history.

(56) References Cited

U.S. PATENT DOCUMENTS

| | | | |
|---|---|---|---|
| 8,819,092 B2 * | 8/2014 | Ludwig | H04L 61/1582 707/827 |
| 9,535,754 B1 * | 1/2017 | Suarez | G06F 9/5011 |
| 9,792,240 B2 * | 10/2017 | Jose | G06F 9/455 |
| 10,721,294 B2 | 7/2020 | Alfieri et al. | |

(Continued)

FOREIGN PATENT DOCUMENTS

WO 2016/118164 A1 7/2016

OTHER PUBLICATIONS

International Search Report issued in International Application No. PCT/IB2016/055966 dated May 19, 2017.

(Continued)

*Primary Examiner* — Getente A Yimer
(74) *Attorney, Agent, or Firm* — Dentons US LLP

(57) ABSTRACT

In a fabric-based infrastructure a flexible scalable server is obtained by physical disaggregation of converged resources to obtain pools of a plurality of operationally independent resource element types such as storage, computing, networking and more. A plurality of computing facilities can be created either dynamically or statically by a resource manager by abstracting instances of resources from such pools of a plurality of resource element types expressed within a single disaggregated logical resource plane.

14 Claims, 4 Drawing Sheets

(56) References Cited

U.S. PATENT DOCUMENTS

| | | | |
|---|---|---|---|
| 2011/0055844 A1* | 3/2011 | Nguyen | G06F 1/26 |
| | | | 718/104 |
| 2011/0202927 A1 | 8/2011 | Miloushev et al. | |
| 2011/0271014 A1 | 11/2011 | Turner et al. | |
| 2011/0314160 A1 | 12/2011 | Turner et al. | |
| 2012/0017037 A1 | 1/2012 | Riddle et al. | |
| 2014/0122560 A1 | 5/2014 | Ramey et al. | |
| 2014/0359044 A1 | 12/2014 | Davis et al. | |
| 2015/0370665 A1* | 12/2015 | Cannata | G06F 3/0685 |
| | | | 714/4.11 |
| 2015/0381426 A1 | 12/2015 | Roese et al. | |
| 2016/0179582 A1 | 6/2016 | Skerry et al. | |
| 2016/0216982 A1 | 7/2016 | Variath et al. | |
| 2016/0269228 A1 | 9/2016 | Franke et al. | |
| 2017/0295107 A1* | 10/2017 | Salapura | G06F 9/5083 |
| 2017/0295108 A1* | 10/2017 | Mahindru | H04L 47/805 |
| 2017/0302738 A1 | 10/2017 | Dimnaku et al. | |
| 2018/0241723 A1* | 8/2018 | Yoshikawa | H04L 63/08 |

OTHER PUBLICATIONS

Written Opinion of the International Searching Authority issued in International Application No. PCT/IB2016/055966 dated May 19, 2017.
USPTO Office Action issued in related U.S. Appl. No. 16/340,073 dated Aug. 27, 2020.
Office Action issued by the USPTO in connection with related U.S. Appl. No. 16/340,073 dated Mar. 17, 2021.

* cited by examiner

HYPERSCALE ARCHITECTURE

CROSS-REFERENCE TO RELATED APPLICATIONS:

The present application is a National Stage of PCT/IB2016/055966, filed Oct. 5, 2016, which is incorporated by reference herein in their entirety.

TECHNICAL FIELD

The present invention relates to a scalable server architecture and a method for operating a scalable server.

BACKGROUND ART

Traditionally, a compute node has a processor (or CPU) with defined processing capability, a local memory, allocated for the compute node and an IO interface.

This compute node creates an independently capable server with the compute/memory/networking resources that are generally enough to be able to manage the most complex tasks.

The CPU is the master of the node, with sole ownership over the attached memory, and the I/O operations which provides its interface to the external world. The processor I/O is the link the processor has with the other typical system resources, such as persistent storage (HDD/SDD) and Networking (Ethernet NIC).

This architecture was made popular when the desktop PC became commodity, and hasn't fundamentally changed since, even when adopted into the server market. However, to scale to the computing demands of today's applications, servers must scale beyond the resources that can be supplied by a single compute node.

Existing solutions to these requirements can be summarized as follows.

More processing performance: Use higher performance CPU, along with multicore processing, and NUMA-processing to create a larger more capable processing element.

Increase the number of memory channels to local memory, so as to increase the total available memory, and the bandwidth to that memory.

Increase the number and speed of the I/O interfaces to support fast/larger storage and network interfaces.

Duplicate multiples of independent compute nodes and use clustering software (and more recently, hyperconvergent software above a virtualization layer) to try and manage the multiples compute nodes as a single datacentre/cluster.

There are various restrictions to future applicability of these approaches and fundamental physical aspects that means these approaches are reaching the end of their applicability:

Faster processors are at the limits of fabrication technology, with the end of silicon scaling, and the consequential limit to power/density to further increase CPU performance. Likewise the memory capability is limited by the physical silicon size (limited by fabrication and thermal issues) and the number of pins to connect to memory, along with the physical distance memory can be placed away from the processor element.

To scale beyond a multicore, NUMA-processing enables a small number of compute nodes to share their common view of the memory and IO of the multi-socket server. However, to maintain this illusion of unity, significant performance and complexity is required, with any returns through such scaling becoming negligible after 4 to 6 compute nodes.

Virtualization software provides balancing between a system's computing resources that must be averaged between multiple applications, however at the cost of loss of performance, and complex management to get right. This is why many cloud providers can show only 10% system utilization on their servers because the balance of resources is not appropriate.

Several solutions have been developed to try to overcome the above limitations of present approaches.

In US 2011/0271014 it is presented a system and a method for identifying a memory page that is accessible via a common physical address, providing direct access to an I/O device by a virtual machine with memory managed using memory disaggregation. In this solution the process is controlled by a single processor which manages the mapping of physical addresses.

In US 2016/0216982 it is presented a forward fabric platform system comprising a plurality of nodes, an interconnect backplane coupled between the plurality of nodes and a Forward Fabric Manager (FFM). The Fabric computing system has an embedded software defined network whose frontend is managed by a security manager which is physically in a node. In this solution everything is controlled and not independent from the host.

In US2012017037 it is presented a distributed storage system comprising a plurality of compute nodes executing one or more application processes capable of accessing a persistent shared memory implemented by solid state devices physically maintained on the nodes, with the application processes that communicate with a shared data fabric (SDF) to access the memory. In this solution each persistent memory is controlled by a controller internal to the node.

In US 2014/0122560 is presented a flexible scalable server comprising a plurality of tiled compute nodes, each node comprising a plurality of cores formed of a processor and a switching circuitry. The switching circuitry couples the processor to a network among the cores and the cores implement networking functions within the compute node. In this solution, the inter-node routing is done via software on the computing node, so the processing of the inter-node routing is made by processors of the node.

All the above solutions have limitations concerning the need of a processor of the node that somehow manage the access to the resource elements.

Since the processing element/CPU is the master of the node, interactions between different nodes, and the resources of a node must be controlled and managed by the CPU, creating inefficiencies due to the software processing of I/O transactions, and a limit to the capabilities of any given storage or networking resource. For example, no existing software on such a system can manage the bandwidth of a 100 Gb/s Ethernet connection.

In addition, there is no flexibility in the system architecture other than what the CPU enables. For example, if a given processing load needs twice as much IO networking bandwidth to a given compute level, this can only by addressed by a completely different system designed with twice the networking bandwidth interfacing with the processing element. This IO bottleneck is well understood, and effects for example GPU accelerators as well as high speed network interfaces.

SUMMARY OF THE INVENTION

It is an object of the present invention to propose a scalable server architecture able to overcome the above discussed limits of existing solutions.

According to a first aspect of the present invention, the above objects and further more are attained by a compute element comprising a plurality of physical resource elements defined across a physically converged substrate, and a fabric switch configured to couple the physical resource elements each other by using a processor aware addressing scheme to physically disaggregate various types of resource elements so that they form pools of a plurality of operationally independent resource element types expressed within a single plane of disaggregated logical resources. The fabric switch also bridge to an external network.

According to another aspect of the present invention, the above objects and further more are attained by a scalable server comprising plural compute elements, each compute element comprising a plurality of physical resource elements defined across a physically converged substrate, and a fabric switch configured to couple the physical resource elements to each other by using a processor aware addressing scheme to physically disaggregate resource element types so that they form pools of a plurality of operationally independent resource element types, and wherein a further fabric switch is configured to couple said compute elements each other for extending the physically converged substrates in a global physical converged substrate, wherein said pools of a plurality of operationally independent resource element types of each compute element are expressed together within a single plane of disaggregated logical resources.

According to another aspect of the present invention, the above objects and further more are attained by a method of operating a scalable server machine comprising one or more physically converged substrates, across each physical converged substrate being defined a plurality of physical resource elements, a fabric switch for connecting the physical resource elements across the physical converged substrates using a processor native addressing, wherein the method comprises: physically disaggregating the physical resource elements; expressing the disaggregated physical resource elements as pools of a plurality of operationally independent logical resource element types within a single plane of disaggregated logical resources; and abstracting a computing facility from said pools of logical resource elements types by selecting instances of logical resource elements from said pools of logical resource elements types.

The method above defined can adopt and use the most capable of processor devices, along with their physical memory interface capability, to implement the processing element. This element only requires the CPU functionality along with its memory interface, plus at least one link to the global resource fabric switch. This permits a system according to the invention to use the best processors, in a system that does not need costly and market limiting integration of the other system resources.

In addition, since each element of the system can be selected and integrated in different configurations, the solution can address any market with a high return on investment.

Furthermore, since resources are locally attached, then the highest performance and lowest cost can be achieved through integration and locality. However, since each compute node also exposes further its share (i.e. everything it can share) to the global resource pool, all processors can arbitrate remote access thus creating disaggregated pools of resources.

Finally, since each element can instantiate its physical interfaces anywhere in the global resource substrate, then the capability of any element can be accessed as if that resource was physically attached within the other resource element. For example, storage of a remote compute node can be exposed directly along with the storage local to a node. The buffers of a device resource element can be placed directly within the memory of any resource element. Such physicalization has the ability to remove the physical limitations of attaching a resource to any single processing element, limitations such as pin count, distance, thermal, fabrication.

BRIEF DESCRIPTION OF DRAWINGS

Description of Drawings

Figure 1:
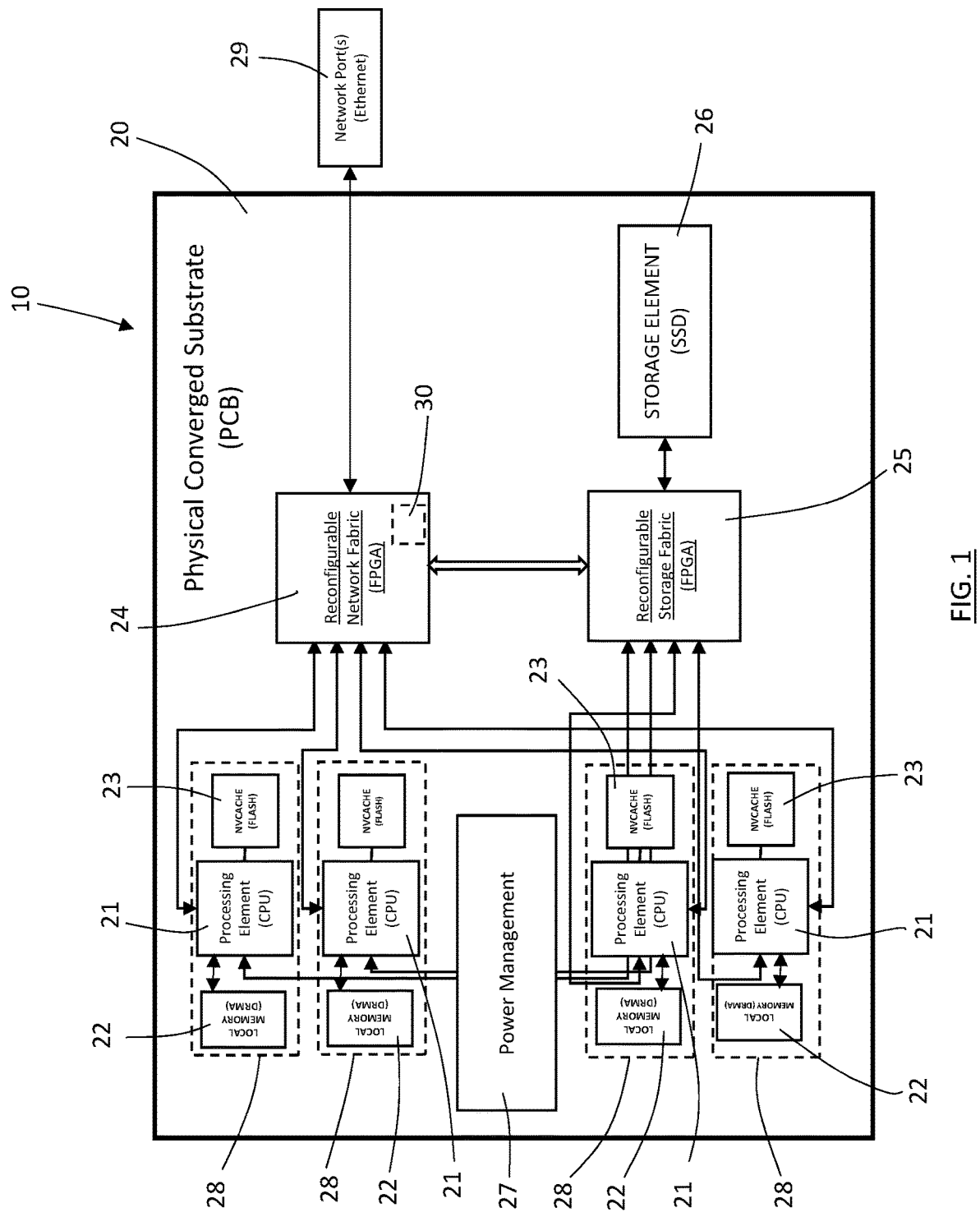
Figure 2:
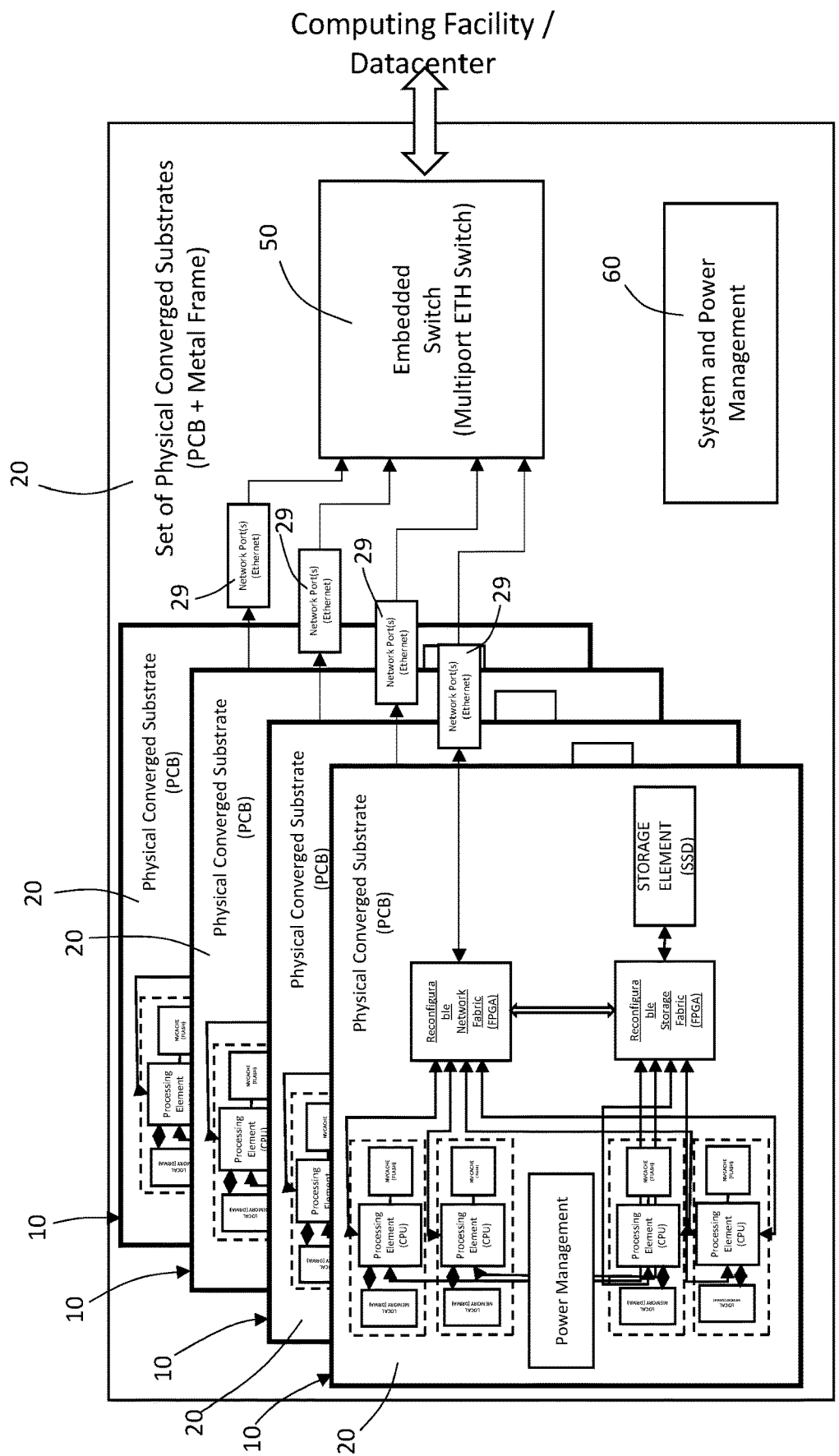
Figure 3:
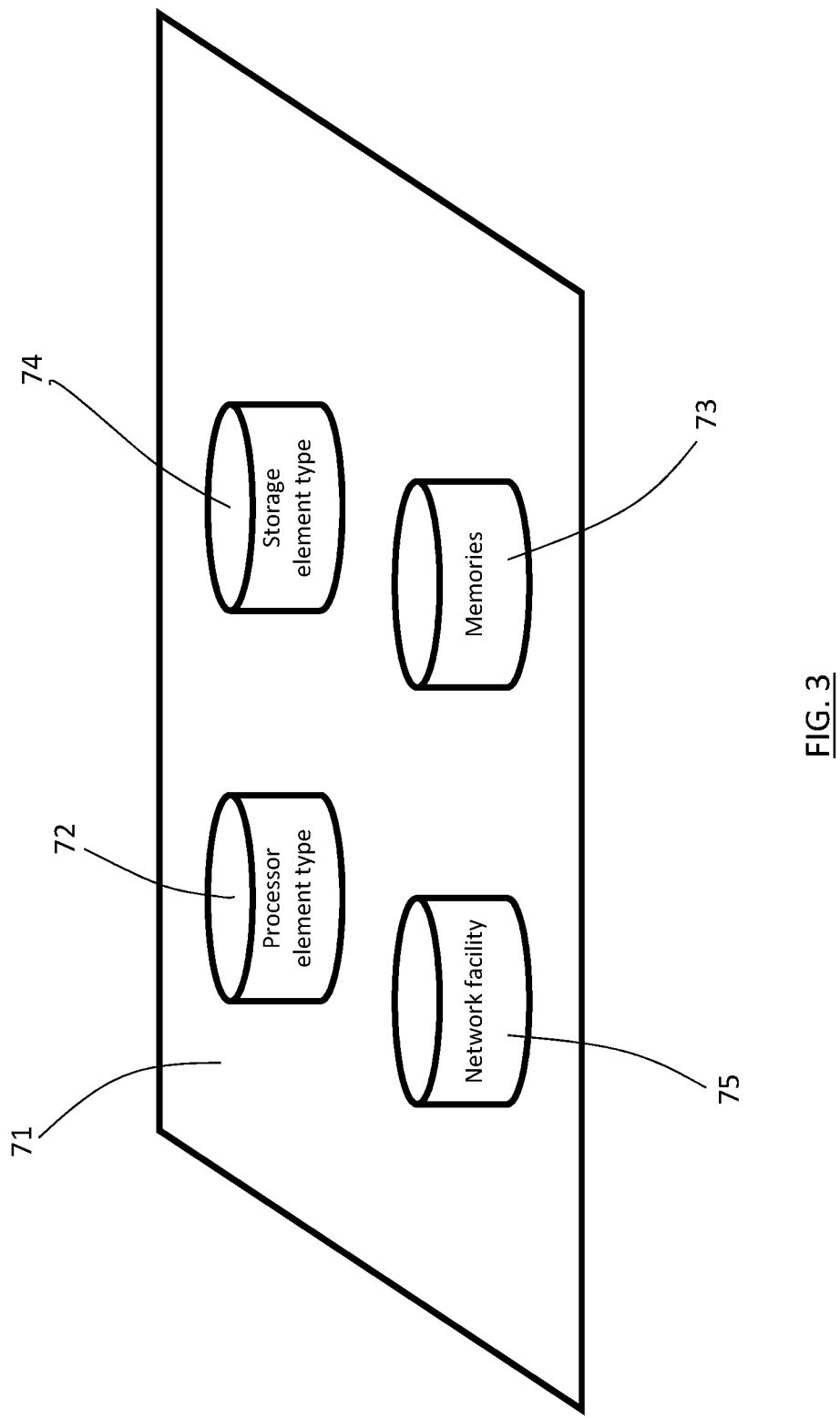
Figure 4:
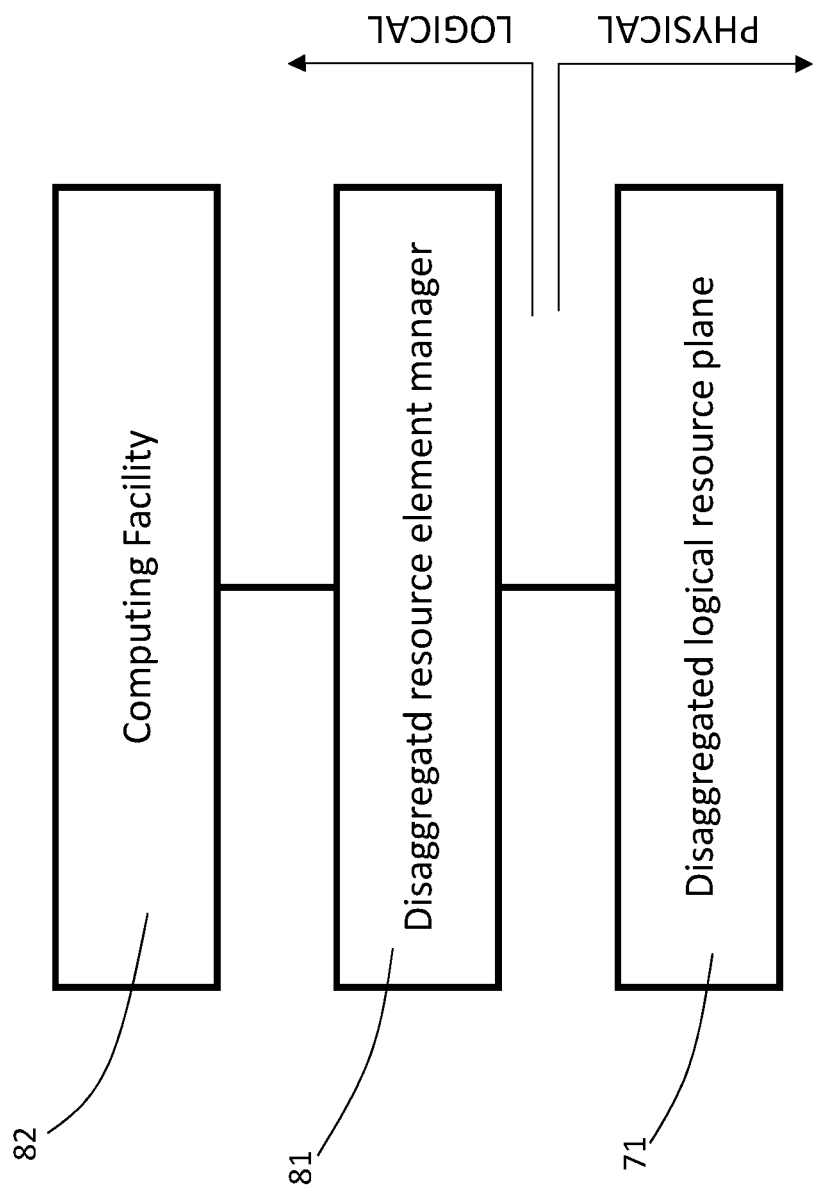

For a better comprehension of advantages and features, an embodiment of the invention is illustrated by way of example, and not by way of limitation, in the figures of the accompanying drawings in which:

FIG. 1 shows a block diagram of physical resource elements arranged on a physical converged substrate in a compute node according to the invention;

FIG. 2 shows a block diagram of a set of physical converged substrates arranged in a physical server machine in a scalable server according to the invention;

FIG. 3 shows a block diagram of a plane of disaggregated logical resources according to the invention;

FIG. 4 shows a block diagram of the main steps of a method according to the invention.

DETAILED DESCRIPTION OF PREFERRED EMBODIMENTS

With reference to FIG. 1, it is indicated as a whole with 10 a compute element in a fabric-based infrastructure, which physically consists in a plurality of physical resource elements defined across a physically converged substrate, 20, which is a printed circuit board. The physical resource elements are hardware or reconfigurable hardware or other such computing technology, that in the present specific, but not limiting, embodiment of the invention comprise: processing elements, 21, local memory (DRAM) elements, 22, NV Cache (flash) elements, 23, a reconfigurable Network Fabric element, 24, a reconfigurable storage fabric element, 25, an SSD storage element, 26, and a power management element, 27. Each of a processing element 21, a local memory element 22 and a NV cache element 23 form a computing unit, 28. The converged printed substrate 20 comprises four computing units 28. The reconfigurable network fabric 24 is configured to provide the functionalities of networking resource element types with a fabric switch 30 adapted to couple the plurality of other physical resource elements to each other by using a processor native addressing or processor aware addressing scheme and also adapted to bridge to an external network through the network port 29. In particular, in FIG. 1 are shown with arrows the physical connections of the fabric switch 30 with each processor element 21, with the reconfigurable storage fabric 25 and with the network port 29 of the physical converged substrate 20. The fabric switch 30 is also physically connected to the network resource implemented in the Reconfigurable Network Fabric (FPGA) 24. The SSD storage element 26 is removably coupled to the physical converged substrate 10 through a specific slot for SSD.

Advantageously, the compute element 10 is designed for providing convergence of processing, memory, storage and networking system resources with a physical balanced ratio of capabilities.

Anyway, in different embodiments of the invention, across the physical converged substrate 20 can be defined more or different physical resource elements such as accelerators and any other resource element type used within a computer facility that are either as a master or as a slave to another physical resource element.

In any case, across a physical converged substrate 20 according to the invention are defined a plurality of resource element types selected among processing, storage, networks, accelerators, memories and any such other element type.

According to the present invention, a compute element 10 is the disaggregation of the physical resource elements defined across the physically converged substrate 20, whose result is a plurality of operationally independent resource element types each resource element type being composed of a pool of resource elements.

With reference to FIG. 2, an embodiment of a scalable server machine according to the invention comprises a set of four physically converged substrates 20, mounted in a metal frame, 40, also providing an embedded switch, 50, which is for instance a multiport Ethernet switch, and a system and power management facility, 60.

The embedded switch 50 operates as a network resource element to further extend the fabric switch and then the physically converged substrate in a global physical converged substrate and to bridge it to an external network.

Alternatively, the embedded switch cannot be present and the compute elements 10 are connected directly without an embedded switch to an external network. Accordingly, the work of the above further fabric switch is performed directly by the fabric switches 30 of the compute elements 10.

In the embodiment of FIG. 2 four identical compute elements 10 are mounted in the metal frame 40, but obviously different compute elements 10 according to the invention can be mounted in a same rack.

With reference to FIG. 3, the plurality of pools of resource element types of the various compute elements 10 can then be expressed in a single disaggregated logical resource plane, 71. With reference to the embodiment of FIG. 2, the single disaggregated logical resource plane 71 expressing the set of compute elements 10 provides the following resource element types: a processor element type, 72, a memory element type, 73, a persistent storage element type, 74, and a networking element type, 75.

Obviously, where the physical resource elements defined across any physically converged substrate 20 of a scalable server according to the invention contain other type of resources, such as accelerators, the disaggregated logical resource plane, 71, also contain such resource element type.

With reference to FIG. 4, it has to be stressed that each resource element in a pool of resource elements of a resource element type in the disaggregated logical resource plane 71 operates independently of any other resource element so that a plurality of them can be encapsulated, one or more instances for each resource element type, by a disaggregated resource element manager, 81, to create a computing facility, 82. Accordingly, a computing facility 82 is created by selecting any number of instances of any type of logical resource element from said pools of logical resource element types of the disaggregated logical resource plane. The disaggregation of the physical resource elements (71, 72, 73, 74, 75, 76) and subsequent encapsulation of instances of logical resource elements performed by the disaggregated resource element manager, 81, is made possible thanks to the processor native or processor aware addressing scheme which is adopted, opposed to conventional networking aware addressing schemes.

More specifically, a computing facility 82 can be created dynamically or statically by a) physicalization of resource elements through a common physical address space or b) virtualization of resource elements over any form of abstracted communication or c) any combination thereof.

In the logical view of the method the invention, each resource element type (72, 73, 74, 75) become a logical pool of resources built through traditional processor SoC addressing schemes into a global pool of resources. For example, no single resource element is the master of the compute facility 82, and, as such, networking can serve storage without processing involvement. It also means the capabilities of each compute element 10 can be independently defined and instantiated without the traditional cost of building a new SoC with different IO capabilities.

In the physical view of the method of the invention, each compute facility 82 is created with the convergence of processing, memory, storage and networking system resources using a physical balanced ratio of capabilities required to create the compute element 10. A single compute facility 82 therefore can include any number of processing elements 21, storage elements 25, 26 or networking elements 24 to create a compute facility 82. Each physical resource element (21, 22, 23, 24, 25, 26) cannot exist independently but only when connected with one or more of the other physical resource element types. The resource elements are arranged locally using a processor aware addressing scheme of physical disaggregation and therefore they also need to interconnect to become a meaningful system.

There is not a precise CPU allocation and a memory dedicated to the processing unit but a pool of memories distributed across the compute elements which can be used by the different processing units and the different processing units can be connected together to adapt the processing capability to the requirement of the specific required tasks. Likewise, the global resource pool addressing scheme allow the physical IO resources placed anywhere in the system to be attached to a processing element as if the resource was physically attached to the local address bus of the processor.

All logical resources are therefore considered at the same level of importance in the system.

Additionally, it is not necessary to access the CPU to 'speak' with the memory or the resources physically associated with a compute facility 82, but access is possible directly through the global resource address without management by any other element of the system, (assuming the appropriate security and access privileges).

It is understood that what described above is a pure and not limiting example, therefore, possible detail variants which could be necessary for technical and/or functional reasons, are considered from now on within the protective scope defined by the claims below.

The invention claimed is:
1. A compute element comprising:
a plurality of physical resource elements of different types defined across a physically converged substrate, the physical resources elements being sufficient to operate as an independent server; and
a switch fabric on the substrate coupling the physical resource elements to each other using a processor native addressing or a processor aware addressing scheme and disaggregating the physical resource elements into at least two pools of operationally independent resource element types which are expressed within a single plane of disaggregated resources, the switch fabric operative to bridge the disaggregated resources to an external network, the switch fabric being com- prised of one or more fabric switches physically connected to the physical resource elements.

2. The compute element according to claim 1, wherein the physical resource elements defined across said physically converged substrate comprise at least a processing element, a storage element, a memory element, and a network element.

3. The compute element according to claim 1 or 2, wherein the physical resource elements defined across said physically converged substrate comprise an accelerator element.

4. The compute element according to claim 1, wherein the physical resource elements comprise at least a computing element comprising a processor element and one or more memory elements.

5. The compute element according to claim 1, wherein the physical resource elements comprise at least a reconfigurable network fabric in which is configured one of said one or more fabric switches.

6. The compute element according to claim 1, wherein the physical resource elements comprise at least a reconfigurable storage fabric.

7. A scalable server comprising plural compute elements, each compute element comprising:
a plurality of physical resource elements of different types defined across a physically converged substrate, the physical resources being sufficient to operate as an independent server; and
a switch fabric on the substrate coupling the physical resource elements to each other using a processor native addressing or a processor aware addressing scheme and disaggregating the physical resource elements into at least two pools of operationally independent resource element types, the switch fabric bridging to an external network, the switch fabric being comprised of one or more fabric switches physically connected to the physical resource elements, wherein,
the switch fabrics of the compute elements extend the physically converged substrates into a virtual global physically converged substrate, and
the pools of the operationally independent computing resource element types of each compute element are expressed together within a single plane of disaggregated resources.

8. The scalable server according to claim 7, wherein the physical resource elements of at least one compute element comprise at least a processing element, a storage element, a memory element, and a network element.

9. The scalable server according claim 8, wherein the physical resource elements the at least one compute element comprise an accelerator element.

10. The scalable server according to claim 7, wherein the physical resource elements of the at least one compute element comprise at least a reconfigurable network fabric in which is configured said fabric switch.

11. The scalable server according to claim 7, further comprising;
a metal frame for mounting a set of said physically converged substrates; and
an embedded switch embedded in said metal frame and operating as a network resource element to extend the fabric switches and the physically converged substrates into the virtual global physically converged substrate.

12. A method of operating a scalable server comprising two or more physically converged substrates, across each of which are a plurality of physical resource elements of different types, and on each of which is a switch fabric, the physical resources being sufficient to operate as an independent server the switch fabric of each of the two or more physically converged substrates connecting the physical resource elements of the physically converged substrate to each other and to the physical resource elements of another of the two or more physically converged substrates using a processor native addressing scheme, each switch fabric being comprised of one or more fabric switches, the method comprising:
disaggregating the physical resource elements using the switch fabrics and the processor native addressing scheme;
expressing the disaggregated physical resource elements as at least two pools of operationally independent resource element types within a single plane of disaggregated resources;
bridging the disaggregated resource elements to a network external to the substrates via the switch fabrics; and
combining said pools of operationally independent resource element types into a computing facility by selecting instances of disaggregated resource elements from said pools of operationally independent resource elements types.

13. The method of operating a scalable server according to claim 12, wherein the physical resource elements on least one of the two or more physically converged substrates, comprise at least a processing element, a storage element, a memory element, and a network element.

14. The method of operating a scalable server according to claim 13, wherein the physical resource elements comprise an accelerator element.

* * * * *